United States Patent
McIntyre (12)

(10) Patent No.: US 6,724,496 B1
(45) Date of Patent: Apr. 20, 2004

(54) REMOTE PRINT JOB PROCESSING

(75) Inventor: C. Kevin McIntyre, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,381

(22) Filed: Oct. 29, 1999

(51) Int. Cl.[7] .............................................. G06F 15/00
(52) U.S. Cl. ..................................... 358/1.15; 358/1.13
(58) Field of Search ........................ 358/1.1, 1.9, 1.11, 358/1.12, 1.13, 1.14, 1.15, 401, 407, 434

(56) References Cited

U.S. PATENT DOCUMENTS 6,076,120 A * 6/2000 Hatayama .................... 710/20
6,151,134 A * 11/2000 Deppa et al. .............. 358/1.15

FOREIGN PATENT DOCUMENTS

WO     WO96/01449     1/1996

\* cited by examiner

Primary Examiner—Mark Wallerson

(57) ABSTRACT

A print job representing a visible output of a document is created from a print job representing the document. The print job contains page description language (PDL) commands. The PDL commands are sent to a computing device where executable code, such as a computer program, translates the PDL commands into a raster image. The raster image is then communicated to an input output (I/O) interface of an imaging system. The I/O interface communicates the raster image to a printing subsystem where the raster image is printed. The print job may be first sent to the computing device for creating the raster image, then the raster image sent to the imaging system. Alternatively, the print job may be first sent to the imaging system where it is redirected to the computing device. The print job is then communicated to the computing device where the raster image is created from the print job. The raster image is then returned to the imaging system for printing.

7 Claims, 2 Drawing Sheets

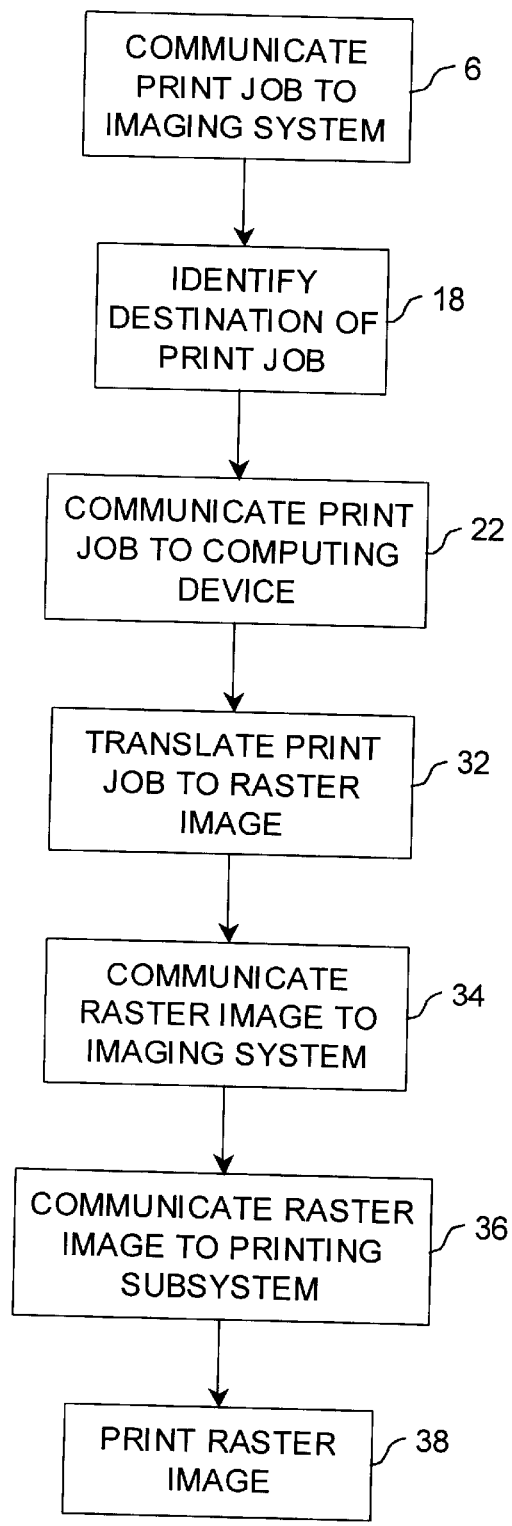
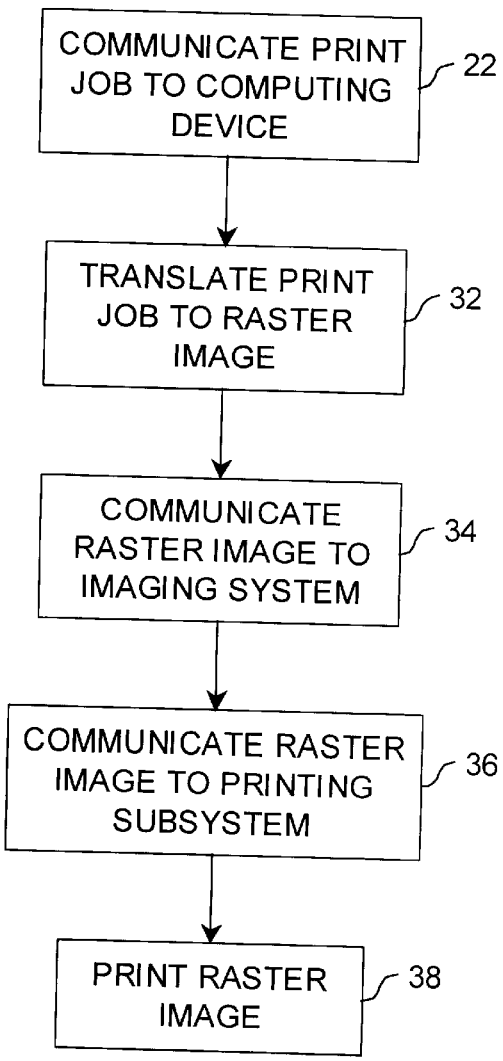
FIG. 2
FIG. 4

REMOTE PRINT JOB PROCESSING

FIELD OF THE INVENTION

This invention relates in general to page description language and, more particularly, to remotely implementing a page description language.

BACKGROUND OF THE INVENTION

A page description language (PDL) is a language for describing the layout and contents of a printed page. PDLs are composed of commands, or operators, for directing the composition of the printed page. Each PDL command provides instructions that are used to create a raster image of the page to be printed. A printer then prints the raster image.

Most modern printers include executable code for translating PDL commands into a raster image of the page to be printed. The executable code for translating the PDL commands into a raster image is conventionally embedded in the firmware of the printer.

Since the code is embedded in the firmware of the printer, in order to replace the code, the firmware of the printer must be modified. Conventionally, the firmware is modified by adding or replacing an integrated circuit, such as a DIMM, that has been encoded with the new executable code. Adding or replacing the integrated circuit with the new code is often difficult for most printer owners.

In addition, in the process of creating or modifying the executable code, it is often desirable to test the executable code. Testing the executable code conventionally requires an integrated circuit be programmed, or "burned", with the executable code and then installed in a printer. The process of programming the integrated circuit with the executable code is usually time consuming and potentially expensive.

SUMMARY OF THE INVENTION

According to principles of the present invention, a print job representing a visible output of a document is created from a print job representing the document. The print job contains page description language (PDL) commands. The PDL commands are sent to a computing device where executable code, such as a computer program, translates the PDL commands into a raster image. The raster image is then communicated to an input output (I/O) interface of an imaging system. The I/O interface communicates the raster image to a printing subsystem where the raster image is printed.

According to further principles of the present invention, the print job may be first sent to the computing device for creating the raster image, then the raster image sent to the imaging system. Alternatively, the print job may be first sent to the imaging system where it is redirected to the computing device. The print job is then communicated to the computing device where the raster image is created from the print job. The raster image is then returned to the imaging system for printing.

Other objects, advantages, and capabilities of the present invention will become more apparent as the description proceeds.

DESCRIPTION OF THE DRAWINGS

FIG. 2 is a flow chart illustrating one embodiment of the method of the present invention.

FIG. 4 is a flow chart illustrating an alternate embodiment of the method of the present invention.

DETAILED DESCRIPTION OF THE INVENTION

Figure 1:
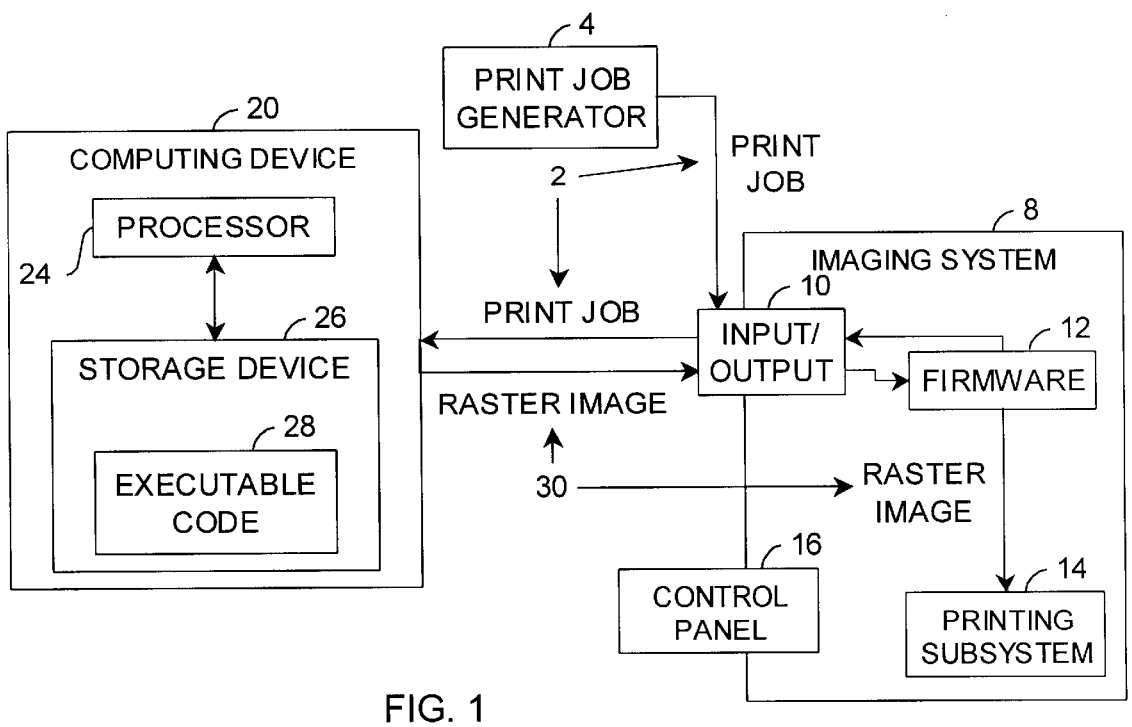
FIG. 1 is a block diagram illustrating one embodiment of the system of the present invention.

Illustrated in FIGS. 1 and 2 are one embodiment of a system and method for creating a visible output of a document from a print job 2 representing the document. Print job 2 is created by a print job generator 4. Print job 2 is a set of instructions describing the document. Print job 2 includes page description language (PDL) commands, or operators. In addition, print job 2 may contain other information, including raster images and bitmaps, frequently included in print jobs 2. Print job generator 4 is typically a printer driver. Alternatively, print job generator 4 is any means by which print job 2 may be generated to include PDL commands.

Once generated, print job 2 is communicated 6 to imaging system 8. Communication of print job 2 to imaging system 8 is accomplished using any means of communication between print job generator 4 and imaging system 8. For example, communication 6 may be accomplished over a network or a parallel port cable. A network means any type of network, such as an internet or an intranet.

Imaging system 8 is any device for printing print job 2. Typically, imaging system 8 is a printer. Alternatively, imaging system 8 may be a facsimile machine or a computer display device, such a monitor. Imaging system 8 includes an input output (I/O) interface 10, firmware 12, a printing subsystem 14, and a control panel 16.

All communication with imaging system 8 passes through I/O interface 10. I/O interface 10 passes all communications either to firmware 12 or, in rare instances, directly to printing subsystem 14.

Firmware 12 receives print job 2 from I/O interface 10. Firmware 12 next decides 18 whether to send the print job outside of imaging system 8 or to process print job 2 within imaging system 8. Print job 2 may be processed by default either within imaging system 8 or outside of imaging system 8. A default processing may be overridden by a command within print job 2 or by a setting entered through control panel 16. Processing print job 2 within imaging system 2 is conventional in the art and will not be discussed further.

Processing print job 2 outside of imaging system 8 is accomplished by computing device 20. Computing device 20 is separate from and remote to imaging system 8. Communication between imaging system 8 and computing device 20 is accomplished using any manner by which data may be communicated between imaging system 8 and computing device 20. For example, the communication may be accomplished over a network, a parallel port cable, or any communication medium.

In order for imaging system 8 to communicate print job 2 to computing device 20 over a network, imaging system 8 must know a network address for computing device 20. This address may either be preprogrammed into imaging system 8, or provided by print job generator 4. Preprogramming the address into imaging system 8 may be accomplished either by embedding the address into firmware 12 or by entering the address through control panel 16.

Computing device 20 includes a processor 24 and a storage device 26. Processor 24 is any device for processing executable code. Storage device 26 is any device capable of storing executable code for retrieval and execution. For example, storage device 26 may be an integrated circuit, such as a memory module, or magnetic storage device, such as a computer disk. Storage device 26 contains executable code 28 for translating print job 2 into a raster image 30.

Executable code 28 is executed in order to translate 32 print job 2 into one or more raster images 30. Each raster image 30 is then communicated 34 to imaging system 8 where it is received by I/O interface 10. I/O interface 10 then passes raster image 30 along to firmware 12 where it is identified as a raster image and forwarded 36 to printing subsystem 14. Alternatively, raster image 30 is communicated 36 directly to printing subsystem 14 from I/O interface 10.

Printing subsystem 14 prints 38 the raster image to create a visible output of the document described by print job 2. Printing subsystem 14 prints raster image 30 either as a whole or by first dividing raster image 30 into strips.

Where imaging system 12 is a printer or a facsimile machine, the visible output is typically produced on paper or other media. Where imaging system 12 is a monitor, the visible output is displayed on the screen of the monitor.

Figure 3:
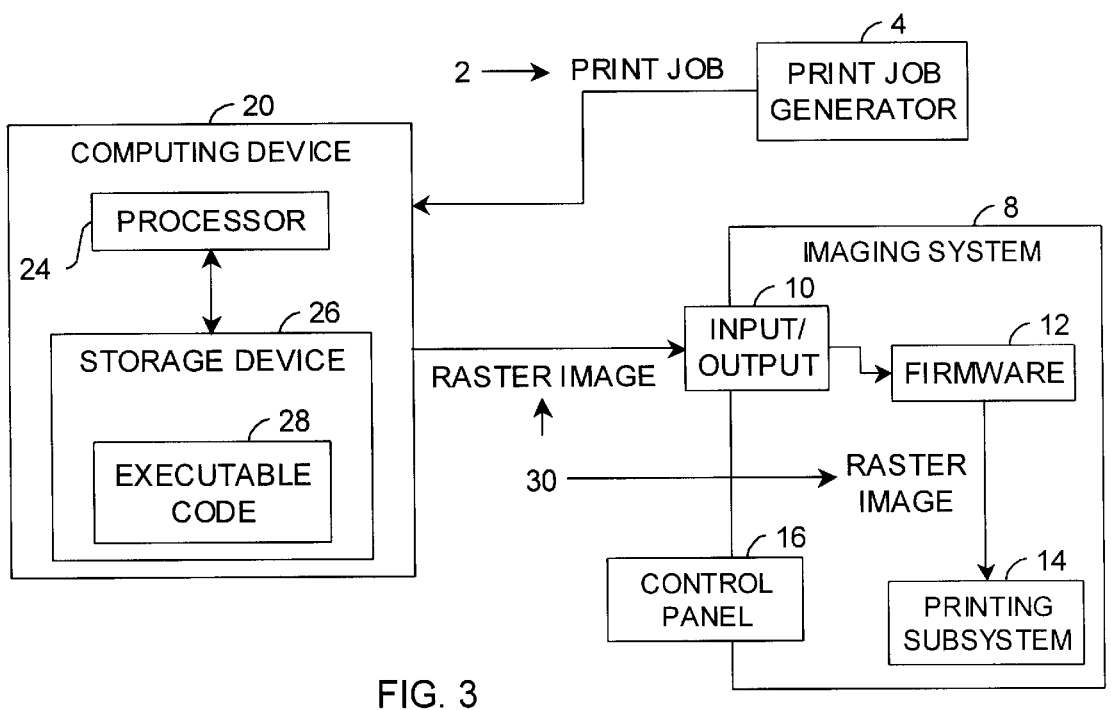
FIG. 3 is a block diagram illustrating an alternate embodiment of the system of the present invention.

Illustrated in FIGS. 3 and 4 are alternate embodiments of the system and method illustrated in FIGS. 1 and 2 and discussed above. Elements common between FIGS. 1 and 3 and FIGS. 2 and 4 are numbered identically.

Once generated by print job generator 4, print job 2 is communicated 22 to computing device 20. Alternatively, print job generator 4 and computing device 20 are the same device.

Communication between job generator 4 and computing device 20 is accomplished using any manner by which data may be communicated between imaging system 8 and computing device 20. For example, the communication may be accomplished over a network, a parallel port cable, or any communication medium.

In order for print job generator 4 to communicate print job 2 to computing device 20 over a network, print job generator 4 must know a network address for computing device 20. This address may either be preprogrammed into print job generator 4, or provided by a user of print job generator 4.

Computing device 20 includes a processor 24 and a storage device 26. Storage device 26 contains executable code 28 for translating print job 2 into a raster image 30.

Executable code 28 is executed upon receipt of print job 2 in order to translate 32 print job 2 into one or more raster images 30. Each raster image is then communicated 34 to imaging system 8.

Imaging system 8 includes an input output I/O interface 10, firmware 12, a printing subsystem 14, and a control panel 16. I/O interface 10 receives raster image 30. I/O interface 10 then passes raster image 30 along to firmware where it is identified as a raster image and forwarded 36 to printing subsystem 14. Alternatively, raster image 30 is communicated 36 directly to printing subsystem 14 from I/O interface 10. Printing subsystem 14 prints 38 the raster image to create a visible output of the document described by print job 2.

In alternate embodiments to the systems and methods described above, executable code 28 translates the PDL commands in print job 2 from a first page description language (PDL) into a second PDL instead of into raster image 30. Print job 2 with the PDL commands in the second PDL is then communicated to imaging system 8. Imaging system 8 then processes print job 2 as is conventional in the art. These alternate embodiments for translating a first PDL into a second PDL allow imaging system 8 to process PDL commands it would otherwise be unable to process.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

What is claimed is:

1. A system for converting a print job representing a document into a raster image representing the document, the print job having page description language (PDL) commands in a first PDL, the system comprising:
   (a) executable code for translating the PDL commands from the first PDL into a second PDL;
   (b) a computing device having a storage device and means for processing the executable code, the executable code stored in the storage device;
   (c) an imaging system having:
      (i) firmware having means for translating the PDL commands in the second PDL into the raster image,
      (i) a printing subsystem for printing the raster image and
      (ii) an input/output (I/O) interface for receiving the raster image from the computing device and communicating the raster image to the printing subsystem;
   (d) means for communicating the print job with the PDL commands in the second PDL from the computing device to the imaging system; and,
      wherein the computing device is external to the imaging system.

2. The system of claim 1 wherein the storage device is a magnetic storage device.

3. The system of claim 1 wherein the storage device is an integrated circuit.

4. The system of claim 1 wherein the firmware further includes means for directing the print job with the PDL commands in the first PDL from the imaging system to the computing device.

5. The system of claim 1 further including means for communicating the print job with the PDL commands in the first PDL to the computing device.

6. The system of claim 1 wherein the means for communicating the print job with the PDL commands in the second PDL from the computing device to the imaging system includes a network connection.

7. The system of claim 1 wherein the means for communicating the print job with the PDL commands in the second PDL from the computing device to the imaging system includes a local connection.

* * * * *